3,299,884
AIR COOLED LAMP HANDLE AND DIAGNOSTIC INSTRUMENT COMBINATION
William C. Moore, Skaneateles, and John D. Connors, Auburn, N.Y., assignors to Welch Allyn, Inc., Skaneateles, N.Y., a corporation of New York
Filed Sept. 16, 1963, Ser. No. 309,094
7 Claims. (Cl. 128—23)

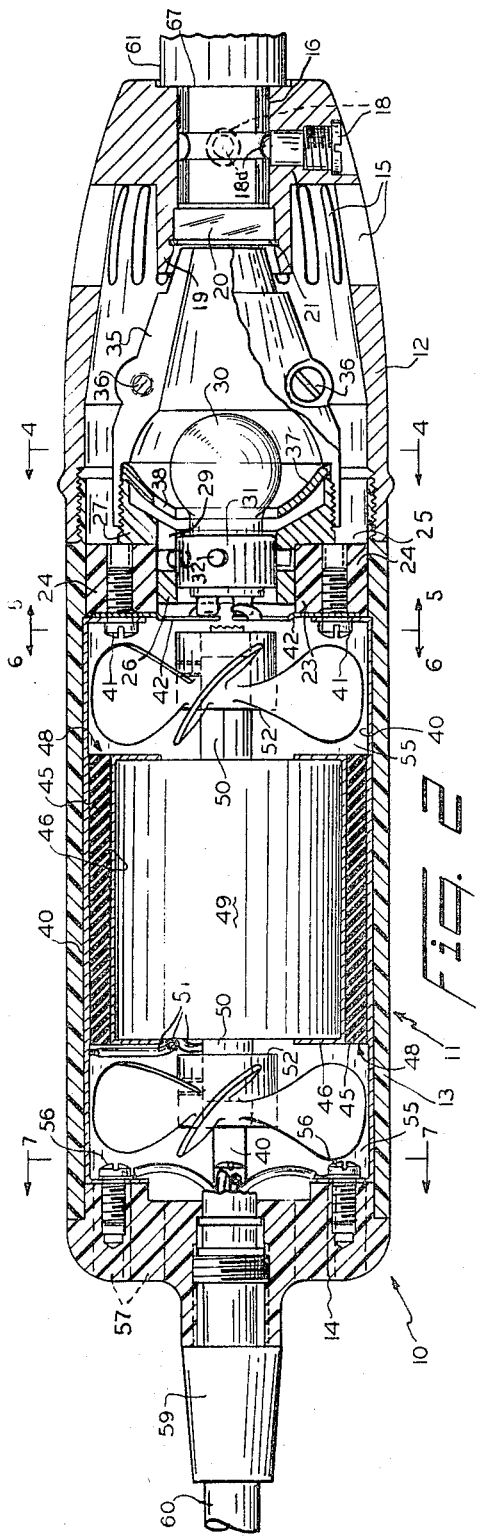
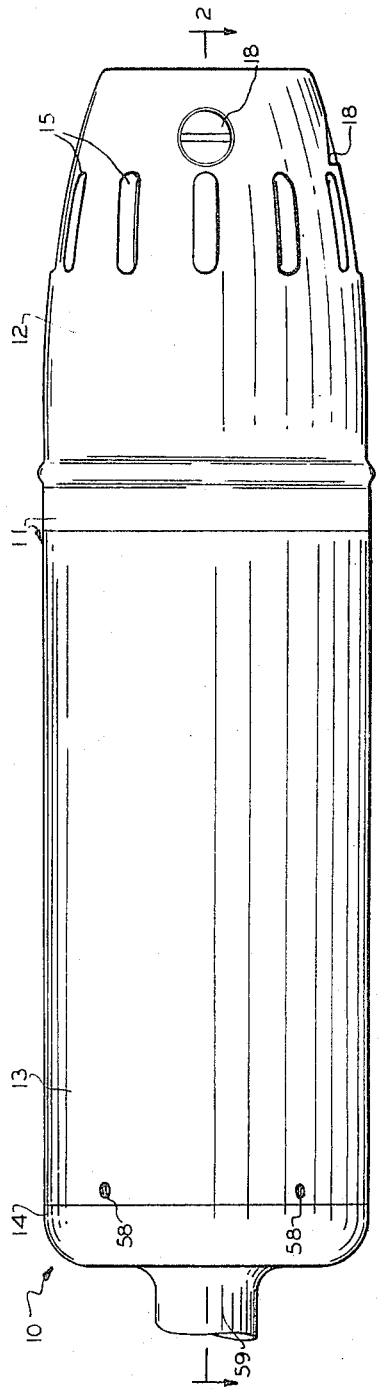

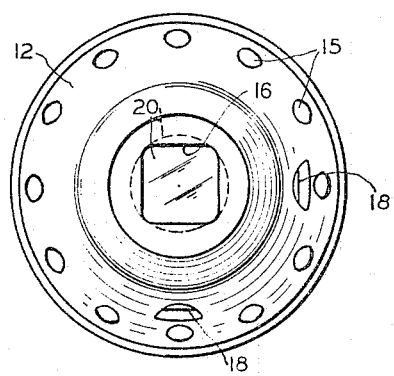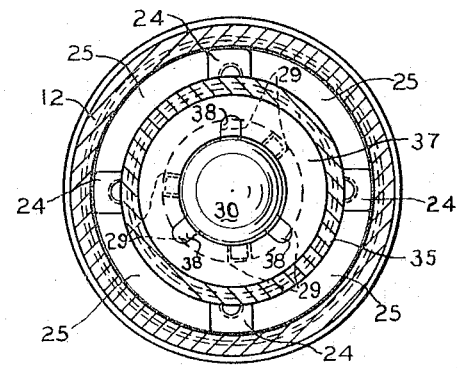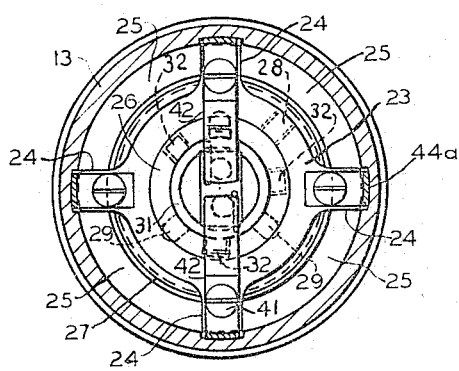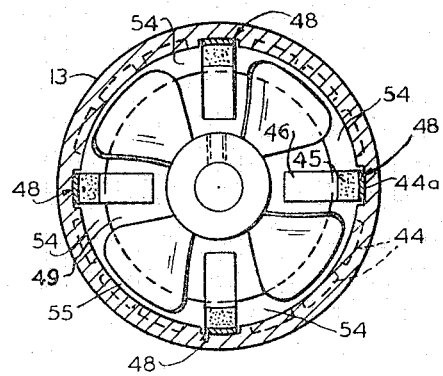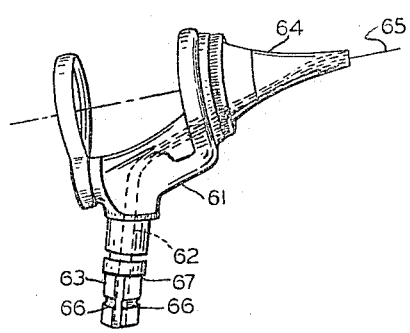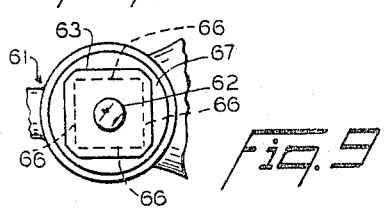
INVENTORS.
WILLIAM C. MOORE
JOHN D. CONNORS

United States Patent Office 3,299,884
Patented Jan. 24, 1967

This invention relates to diagnostic instruments having light conducting means for transmitting light from the proximal to the distal end thereof. More particularly, it relates to a handle adapted to be removably secured to such instruments and containing a powerful light source and means for cooling the same.

Diagnostic instruments recently developed have bundles of minute glass fibers therein for transmitting light from the proximal to the distal end of the instrument so that it is no longer necessary to have a small electric lamp at the distal end of the instrument to illuminate the area being examined or treated. In spite of the advent of improved means for conducting light from one end to the other of the instrument, there has been little improvement in the intensity of the light emitted at the distal end of the instrument because, even if the light source is at the proximal end of the instrument, the source has usually been kept small in order to prevent undesirable heating of the instrument or interference with the line of sight through the instrument.

The primary object of the present invention, accordingly, is to provide means in a diagnostic instrument which will supply light of high intensity at the distal end of the instrument without undesirable increase in temperature of the instrument.

Another important object is to supply light of high intensity at the proximal end of the instrument together with cooling means for the light source so that undesirable heating of the instrument is prevented.

A further object is to provide a light source of high intensity for diagnostic instruments which is remote from the viewing or working passage through the instrument.

A still further object is to provide a handle which may be attached to any one of a plurality of diagnostic instruments, which handle has a light-source of high intensity for said instruments and has means for preventing heat from the high-intensity light source from being transferred to the attached instrument.

Other objects and advantages will become apparent from the following description taken in conjunction with the following drawings, in which:

FIGURE 1 is a side elevational view of a handle according to the invention;
FIGURE 2 is a sectional view thereof on the line 2—2 of FIGURE 1, and showing a portion of a diagnostic instrument secured thereto;
FIGURE 3 is a front end view of the handle of FIGURE 1;
FIGURES 4, 5, 6 and 7 are sectional views taken, respectively, on the lines 4—4, 5—5, 6—6 and 7—7 of FIGURE 2;
FIGURE 8 is a perspective view of a diagnostic instrument adapted to be secured in the handle of FIGURE 1; and
FIGURE 9 is an enlarged, fragmentary bottom plan view thereof.

Referring more particularly to FIGURE 1 of the drawings, the lamp handle 10 has a hollow, three-piece housing 11 comprising a hollow forward portion 12, a tubular mid-portion 13, and a rear or end portion 14.

The forward portion 12 of housing 11 is provided with a plurality of circumferentially spaced slots 15 for admitting air to the interior of the housing. As best seen in FIGURE 2, a square, axially extending hole or well 16 in the end of forward portion 12 adapts the housing for admitting therein the end of a diagnostic instrument, as will hereinafter appear, and two detent plugs 18 are threadedly secured in the housing and radially disposed with respect to the well 16 at 90° to one another. Each plug is provided with a spring-pressed ball-detent 18d adapted to project laterally into the well 16 as shown.

Portion 12 is also provided with a rearwardly projecting annular flange 19 around the well 16 and a flat lens or window 20 is secured against a shoulder in this flange at the inner end of the axial well 16 by a snap-ring 21 engaged in a suitable annular slot in the flange.

The rearward end of portion 12 is threadedly secured to mid-portion 13 of the housing, and secured within portion 13 adjacent its forward end by hereinafter described means is a lamp and reflector support 23. As best seen in FIGURE 5, the support 23 is generally annular in shape and is provided with four radially projecting, angularly spaced legs 24 which engage the interior of the housing with a sliding fit, leaving four air passages 25 between the legs and between support and housing.

In the central, axially-extending space through support 24, the reduced annular neck portion 26 of the reflector mount 27 is secured by means of a set screw 28 (FIG. 5). Neck portion 26 serves as a lamp socket and is provided with three angularly-spaced, L-shaped, bayonet-type slots 29.

Mounted in the central passage through neck portion 26 is an electric lamp 30 having a cylindrical base or socket-engaging portion 31 provided with three radially projecting pins or lugs 32 engaged in the bayonet slots 29. Two of the lugs and engaged slots have an angular spacing less than that between each of them and the third so that the lamp can only be inserted one way.

The enlarged annular portion of mount 27 forward of neck portion 26 is threaded exteriorly and engaged with the interiorly threaded end of a tubular, spherical-conical reflector 35 which extends forward of lamp 30 to the window 20 which may be of plain glass for heat suppression or may also have light-filtering characteristics. Reflector 35 may be made in two pieces, as indicated in FIG. 2, held together by screws 36 or, alternatively, may be made in one piece.

Secured in a shouldered recess between mount 27 and reflector 35 is the annular rim of an elliptical reflector 37 having a centrally located hole for lamp 30 so as to be positioned behind the lamp. As best seen in FIGURE 4, three radially extending slots 38 overlie the entrance to the bayonet slots 29 in the neck 26 of mount 27.

Extending rearwardly from each leg 24 of support 23 is a metal conductor strip 40. Each strip has an inwardly bent tongue secured by a screw 41 to its respective leg 24. A diametrically opposite pair of legs, shown in FIGURES 2 and 5, also have secured thereto, in contact with strip 40, a metal spring-contact element 42 projecting radially inward of the housing and each element has a portion thereof in contact with a respective one of the terminals of lamp 30.

As best seen in FIGURE 6, each conductor strip 40 lies in a slot 44a which is one of a plurality of slots 44 in the inner wall of the tubular portion 13 of the housing. Slots 44 extend axially of the housing and are spaced at regular angular intervals therearound.

Approximately at the center of each conductor strip 40, an elongated rubber strip 45 is cemented thereto, and a motor-engaging U-shaped metal strip 46 is cemented to the inner side of the rubber strip. Each strip 40 with its attached strips 45 and 46 constitute a motor mount 48 for motor 49 (FIG. 2).

Motor 49 is a subminiature electric motor having its shaft 50 projecting axially of the motor at either end and having three wire leads 51 projecting from one end thereof, each lead 51 being connected, as by soldering, to a different one of the conductor strips 40, as indicated in FIGURE 2. Motor 49 is a commercially available motor operating at a high speed on a comparatively low voltage of the order of 24 v.

Each end of shaft 50 has secured thereon a fan blade assembly 52 so as to drive air rearwardly through housing 11. Slots 44 extend the length of motor 49 but slots 44a extend from support 23 to the end portion 14 of housing 11. As best seen in FIGURE 6, therefore, air passages 54, between motor mounts 48 and between housing and motor, extend the length of motor 49, and each of the fan blade assemblies functions in a cylindrical chamber 55 of substantially the diameter of the fans.

Each conductor strip 40 has an inwardly bent tongue secured to the end portion 14 of the housing by a screw 56 as shown in FIGURES 2 and 7. Between the connections to strips 40, portion 14 is provided with arcuately disposed exhaust slots 57 and with set screws 58 securing portions 13 and 14 together as shown in FIGURE 7.

End portion 14 is provided with the usual ferrule 59 and means for locking the electrical conductor cord 60 in place as indicated in FIGURE 2. Cord 60 is a four-wire cord, each wire of which is connected to a different conductor strip 40 by a screw 56 as shown. The wiring for motor 49 and lamp 30 forms no part of the present invention and it will suffice to say that two leads to the motor are connected to a pair of conductor strips 40, and the spring contacts 42 to the lamp are connected to a different pair of strips 40, the third lead to the motor being connected to one of the strips 40 leading to the lamp. Switch means for turning on the lamp and motor and a source of electrical power are provided separate from the housing 11.

Referring to FIGURES 8 and 9, any one of a number of diagnostic instruments, represented by the otoscope 61, may be secured in the handle 10. The otoscope 61 has a bundle 62 of light conducting glass fibers extending from the stem 63 to the speculum 64 where the fibers of the bundle separate and are molded in the wall of the speculum, the fibers being distributed around the central opening through the speculum, as more fully described in a copending application by the same inventors, Ser. No. 233,748, filed Oct. 29, 1962, now Patent No. 3,146,775, issued September 1, 1964. A clear line-of-sight, represented by the line 65, is thus left free of obstruction.

Stem 63 is square in cross section and has its corners beveled as shown. Each side of the square stem has a detent groove 66 thereacross and the end of bundle 62 at the end of the stem is optically polished for receiving light from lamp 30. A shoulder 67 is provided where stem 63 joins the body of the instrument 61.

In operation, the stem 63 is inserted in the square well 16 of the handle 10 and as the end of the stem encounters the detent balls 18a they are pushed back against the springs in plugs 18 until the shoulder 67 at the upper end of the stem encounters the forward end of housing portion 12. At this stage, the ball detents engage the grooves 66 and the lower end of stem 63 faces, but does not quite meet the window or filter 20. The instrument is thereby firmly engaged in the handle 10 but may be removed again by pulling the instrument axially away from the handle.

When lamp 30 and motor 49 are turned on, the light from the lamp is reflected by the elliptical reflector 37 toward window 20. Whatever light is deflected laterally is reflected back by the spherical portion of reflector 35 through its focal point to be reflected again by reflector 37. The axial passage through the conical portion of reflector 35 permits the passage of light to the window 20 and this conical portion also reflects forward any laterally deflected light. Light passing through window 20 is received by the polished end of the bundle 62 and conducted through the instrument 61 for emission at the distal end thereof.

Lamp 30 is preferably of the quartz-iodine type which produces a very bright and intense light but which also gives off heat. In order to prevent the passage of heat from the handle to the diagnostic instrument and also to prevent excessive heating of the handle itself, the motor driven fans 52 are provided to draw air in through the inlet slots 15 around and past the reflector 35, through passages 25 and 54 and out through the exhaust slots 57. Referring to FIGURE 2, it will be seen that slots 15 surround the forward end of reflector 35, and, because of the conical shape of this end of the reflector, air will be drawn over the entire surface of the reflector. As may be seen in FIGURE 5, the passages 25 are most constricted in the region of the spherical portion of reflector 35, around the lamp 30. The air coolant, therefore, moves most rapidly over this portion of the interior of housing 11 providing the maximum cooling action at this point. The passages 54 around the motor are less constricted, and the fan assemblies at both ends of the motor provide means for moving the air quickly past the motor, for cooling the motor, and ejecting the air out of the comparatively large exhaust slots 57 in the end portion 14 of the housing.

It will now be apparent that there has been provided means for conducting light of great intensity to the distal end of a diagnostic instrument, the light source being remote from both the distal and proximal ends of the instrument, together with cooling means also remote from the diagnostic instrument itself.

As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. In combination, a hollow handle housing and a diagnostic instrument, said instrument having light conducting means therein for transmitting light to the distal end of the instrument, the instrument having a polygonal stem projecting therefrom for supporting the instrument and enclosing the proximal end of the light transmitting means, the light-receiving surface of said means being exposed at the end of the stem, said housing having a socket receiving and releasably securing said stem within the housing, the socket having a polygonal cross-sectional configuration corresponding to that of the stem for orienting the instrument in the housing, an electrically powered lamp secured within the housing adjacent said socket, the housing having a continuous light passage between the lamp and the socket for illumination of said exposed surface when the stem is in the socket, and an electrically powered fan in said housing for drawing air over said stem and through said housing to prevent heating of the instrument housing; the socket and stem having cooperating spring biased detent means for detachably securing the stem in the socket.

2. The housing and instrument defined in claim 1 characterized by the neck and the socket each having a cooperating square cross-section configuration for orienting the neck in the socket.

3. The housing and instrument defined in claim 1 characterized by the detent means being a spring pressed ball projecting into the socket and the neck having a cooperating groove therearound.

4. In combination, a hollow handle housing and a diagnostic instrument detachably secured thereto, a light transmitting fiber bundle extending the length of said instrument and having a polished end supported in a portion of the instrument adapted to be received within said housing, an electrically illuminated high intensity lamp supported in said housing adjacent said polished end, an annular concave reflector behind the lamp, a tubular reflector forward of the lamp, the reflectors forming a closed chamber around the lamp and forward of the lamp to the polished bundle end, a plurality of ports in said housing radially spaced around said polished bundle end, a plurality of air passages connected to said ports around the reflectors and within the housing, and an electrically powered fan in the housing for drawing air through said passages for cooling the reflectors and the handle.

5. The housing and instrument defined in claim 4 characterized by having a glass window secured between the tubular reflector and the polished bundle end for shielding the latter from heat within the reflectors.

6. In combination, a hollow handle housing and a diagnostic instrument removably secured thereto, a light-transmitting fiber bundle in said instrument, said bundle having a polished end at the proximal end of the instrument within said housing, a lamp socket secured centrally within said housing, a high-intensity lamp in said socket, an annular elliptically curved reflector around said lamp and socket for reflecting light substantially axially forward of the lamp toward said polished bundle end, a tubular reflector connected to said annular reflector and extending toward said polished end, the tubular reflector having an annular spherically curved portion for reflecting light diverging from the axial direction back on the annular reflector and having a frusto conical portion extending toward said polished end, a transparent window adjacent the polished end closing the smaller end of the frusto conical portion, a plurality of ports in said housing around the polished end of said bundle, a plurality of air passages within said housing and circumferentially spaced about said reflectors, an electrically powered fan in said housing for drawing air through said passages, said passages being connected to said ports and leading past said reflectors for cooling said reflectors and said handle.

7. A diagnostic instrument having a hollow handle removably secured thereto, a light transmitting fiber bundle in said instrument, said bundle having a polished end within said handle, a lamp support secured centrally within said handle, a high-intensity lamp secured on said support adjacent said polished end, an annular reflector around said lamp secured to said support for reflecting light toward said polished end, a tubular reflector secured to said annular reflector and extending toward said polished end for directing light from the lamp on said bundle end, a plurality of inlet ports in said handle spaced around the instrument bundle, a plurality of air passages through said support within the handle and connected to said ports and leading past said reflectors, an electrically powered fan motor centrally mounted in said handle and having radially extending mounts for supporting said motor, openings around said motor between said mounts, at least one fan chamber in said handle at one end of said motor, fan blades driven by said motor in said chamber, said chamber being connected to said air passages and said openings for driving air past said reflectors and said motor, electrical connecting means for bringing electrical power from a source outside said handle to said lamp and said motor, and at least one exhaust port in said handle in communication with said openings.

References Cited by the Examiner

UNITED STATES PATENTS

| | | | |
|---|---|---|---|
| 624,392 | 5/1899 | Smith | 128—23 |
| 1,965,865 | 7/1934 | Thompson | 128—23 |
| 2,364,730 | 12/1944 | Leskin. | |
| 3,089,484 | 5/1963 | Hett | 128—6 |

FOREIGN PATENTS 1,123,371  6/1056  France.

RICHARD A. GAUDET, *Primary Examiner.*

DALTON L. TRULUCK, *Examiner.*